United States Patent
Cao et al.

(10) Patent No.: US 11,726,538 B2
(45) Date of Patent: Aug. 15, 2023

(54) METHOD AND A DEVICE FOR POWER SUPPLY SWITCHOVER IN A POWER SYSTEM

(71) Applicant: Siemens Aktiengesellschaft, Munich (DE)

(72) Inventors: Zhen Cao, Nanjing (CN); Feng Xian Cui, Nanjing (CN); Ya Li Wang, Nanjing (CN); Di Jun Gao, Nanjing (CN); Lei Ming Qin, Nan Jing (CN)

(73) Assignee: Siemens Aktiengesellschaft, Munich (DE)

( * ) Notice: Subject to any disclaimer, the term of this patent is extended or adjusted under 35 U.S.C. 154(b) by 93 days.

(21) Appl. No.: 17/381,380

(22) Filed: Jul. 21, 2021

(65) Prior Publication Data

US 2022/0026971 A1    Jan. 27, 2022

(30) Foreign Application Priority Data

Jul. 23, 2020 (CN) .......................... 202010714973.7

(51) Int. Cl.
*G06F 1/30*         (2006.01)
*G06F 1/3206*       (2019.01)

(52) U.S. Cl.
CPC .............. *G06F 1/30* (2013.01); *G06F 1/3206* (2013.01)

(58) Field of Classification Search
CPC .................................. G06F 1/30; G06F 1/3206
See application file for complete search history.

(56) References Cited

U.S. PATENT DOCUMENTS

| 4,812,943 A * | 3/1989 | Jones ...................... H02H 9/02 361/95 |
| 10,348,124 B1 | 7/2019 | MacGregor et al. | |
| 2009/0046400 A1* | 2/2009 | McCarthy ............. H02H 3/063 361/42 |
| 2012/0326504 A1 | 12/2012 | Ballantine | |

(Continued)

FOREIGN PATENT DOCUMENTS

| EP | 2681825 A2 | 1/2014 |
| EP | 2724439 B1 | 6/2016 |

(Continued)

OTHER PUBLICATIONS

Extended European Search Report dated Nov. 24, 2021.

*Primary Examiner* — Gary Collins
(74) *Attorney, Agent, or Firm* — Harness, Dickey & Pierce, P.L.C.

(57) ABSTRACT

A method and a device are for power supply switchover in a power system, including two power supplies, each being connected to a bus through an incoming line. The power supply currently in operation is used as the main power supply and the other power supply is used as a backup power supply. Both the incoming line and the bus have three phases, and the lines are connected by their phases. In an embodiment, the method includes: determining whether there is at least one sound phase among the three phases after identifying a fault in the power system; and if there is, obtaining a power data on the sound phase before the main power supply is disconnected. The power data is usable to determine whether the backup power supply meets the condition for connecting in the quick mode after the main power supply is disconnected.

19 Claims, 5 Drawing Sheets

(56) References Cited

U.S. PATENT DOCUMENTS

2015/0244207 A1* 8/2015 Narita .................... H02J 9/061
　　　　　　　　　　　　　　　　　　　　307/64
2015/0333657 A1 11/2015 Allert et al.

FOREIGN PATENT DOCUMENTS

| JP | 2015532582 A | 11/2015 |
| KR | 20200005070 A | 1/2020 |

* cited by examiner

METHOD AND A DEVICE FOR POWER SUPPLY SWITCHOVER IN A POWER SYSTEM

PRIORITY STATEMENT

The present application hereby claims priority under 35 U.S.C. § 119 to Chinese patent application number CN 202010714973.7 filed Jul. 23, 2020, the entire contents of which are hereby incorporated herein by reference.

FIELD

Various example embodiments of the invention generally relate to the field of power systems, and in particular to a method and a device for power supply switchover in a power system.

BACKGROUND

Currently, devices used for fast bus transfer (FBT) can be used for switching between two power supplies. During normal operation, one power supply currently in operation is used as the main power supply, and the other power supply is used as a backup power supply.

The FBT system can quickly switch the bus connected to the load (such as a motor) from the main power supply currently in operation to the backup power supply in the event of a failure. Its function is not only to maintain continuous operation of the equipment, but also to prevent damage to the motor or other connected loads. The switching between two power supplies can only be performed when certain conditions are met.

For example, the condition for the quick mode should be met. This mode is the ideal and also the fastest way of connecting. In the quick mode, within a short period of time (connecting time) when the working circuit breaker is just tripped, the residual voltage attenuation on the bus is very small, the residual voltage on the bus is not lower than the fast-transfer undervoltage lockout value, and the angle difference and frequency difference from the equipment power supply are still within the specified ranges, and the quick mode can be initiated to connect immediately.

That is, connecting is possible when $\Delta\varphi < \Delta\varphi_{fast\ transfer}$ and $\Delta f < \Delta f_{fast\ transfer}$, where $\Delta\varphi$ is the phase angle difference between the attenuated bus voltage and the voltage of the backup power supply, $\Delta f$ is the frequency difference between the attenuated bus voltage and the voltage of the backup power supply, $\Delta\varphi_{fast\ transfer}$ is the set phase difference, and $\Delta f_{fast\ transfer}$ is the set frequency difference, among which $\Delta\varphi$ and $\Delta f$ are measured in real time.

SUMMARY

In view of the above, at least one embodiment of the present invention provides a method for power supply switchover in a power system, wherein the power system comprises two power supplies, each of the power supplies is connected to a bus through an incoming line, the power supply currently in operation is used as the main power supply, the other power supply is used as a backup power supply, both the incoming line and the bus have three phases, the lines are connected by their phases, and the method comprises:

determining whether there is at least one sound phase among the three phases after identifying a fault in the power system;

if there is, obtaining a power data on the sound phase before the main power supply is disconnected, wherein the power data is used to determine whether the backup power supply meets the condition for connecting in the quick mode after the main power supply is disconnected.

At least one embodiment of the present invention also provides a device for power supply switchover in a power system, wherein the power system comprises two power supplies, each of the power supplies is connected to a bus through an incoming line, the power supply currently in operation is used as the main power supply, the other power supply is used as a backup power supply, both the incoming line and the bus have three phases, the lines are connected by their phases, and the device comprises:

an identification unit, used to identify a fault in the power system, and, if a fault is identified, to trigger a determining unit;

the determining unit, used to determine whether there is at least one sound phase among the three phases, and, if there is, to trigger an obtaining unit;

the obtaining unit, used to obtain a power data on the sound phase before the main power supply is disconnected, wherein the power data is used to determine whether the backup power supply meets the condition for connecting in the quick mode after the main power supply is disconnected.

In at least one embodiment, the present invention further provides a device for power supply switchover in a power system, wherein the power system comprises two power supplies, each of the power supplies is connected to a bus through an incoming line, the power supply currently in operation is used as the main power supply, the other power supply is used as a backup power supply, both the incoming line and the bus have three phases, the lines are connected by their phases, and the device comprises:

at least one memory, used to store instructions;

at least one processor, used to execute the method for power supply switchover in a power system according to any of the above according to the instructions in the memory.

The embodiments of the present invention also provide a readable storage medium. The readable storage medium stores machine-readable instructions, and, when the machine-readable instructions are executed by a machine, the machine executes the method for power supply switchover in a power system described in any of the above embodiments.

The readable storage medium stores machine-readable instructions, and, when the machine-readable instructions are executed by a machine, the processor executes any of the methods of at least one embodiment. Specifically, a system or device equipped with a readable storage medium may be provided, the software program code for implementing the functions of any of the above embodiments is stored on the readable storage medium, and a computer or processor of the system or device can read and execute the machine-readable instructions stored in the readable storage medium.

In at least one embodiment, the present invention further provides a method for power supply switchover in a power system including two power supplies, each power supply of the two power supplies being connected to a bus through an incoming line, a power supply of the two power supplies currently in operation usable as a main power supply and another power supply of the two power supplies being usable as a backup power supply, both the incoming line and the bus including three phases, and respective lines being connected by respective phases, the method comprising:

determining whether there is at least one sound phase among the three phases after identifying a fault in the power system; and obtaining power data on the sound phase, upon the determining indicating at least one sound phase among the three phases, before disconnection of the main power supply, the power data being usable to determine whether the backup power supply meets a condition for connecting, in a quick mode after disconnection of the main power supply.

In at least one embodiment, the present invention further provides a device for power supply switchover in a power system including two power supplies, each power supply of the two power supplies being connected to a bus through an incoming line, a power supply currently in operation of the two power supplies being usable a main power supply and another power supply of the two power supplies being usable as a backup power supply, both the incoming line and the bus including three phases, and respective lines being connected by respective phases, the device comprising:

an identification unit, to identify a fault in the power system, and, upon a fault being identified, to trigger a determining unit;

the determining unit, to determine whether there is at least one sound phase among the three phases, and to trigger an obtaining unit, upon determining at least one sound phase among the three phases; and the obtaining unit, to obtain a power data on the at least one sound phase among the three phases before disconnection of the main power supply, the power data being usable to determine whether the backup power supply meets a condition for connecting, in a quick mode after disconnection of the main power supply.

In at least one embodiment, the present invention further provides a device for power supply switchover in a power system including two power supplies, each power supply of the two power supplies being connected to a bus through an incoming line, a power supply currently in operation of the two power supplies being usable a main power supply and another power supply of the two power supplies being usable as a backup power supply, both the incoming line and the bus including three phases, and respective lines being connected by respective phases, the device comprising:

at least one memory, used to store instructions; and at least one processor, to execute according to the instructions in the memory, for power supply switchover in a power system, at least:

determining whether there is at least one sound phase among the three phases after identifying a fault in the power system; and obtaining power data on the sound phase, upon the determining indicating at least one sound phase among the three phases, before disconnection of the main power supply, the power data being usable to determine whether the backup power supply meets a condition for connecting, in a quick mode after disconnection of the main power supply.

In at least one embodiment, the present invention further provides a non-transitory readable storage medium, storing machine-readable instructions, and, upon the machine-readable instructions being executed by a machine, the machine is configured to execute the method for power supply switchover in a power system of an embodiment.

BRIEF DESCRIPTION OF THE DRAWINGS

The example embodiments of the present invention will be described in detail below with reference to the drawings, so that those skilled in the art will better understand the above and other features and advantages of the present invention. In the drawings.

DETAILED DESCRIPTION OF THE EMBODIMENTS

Figure 1:
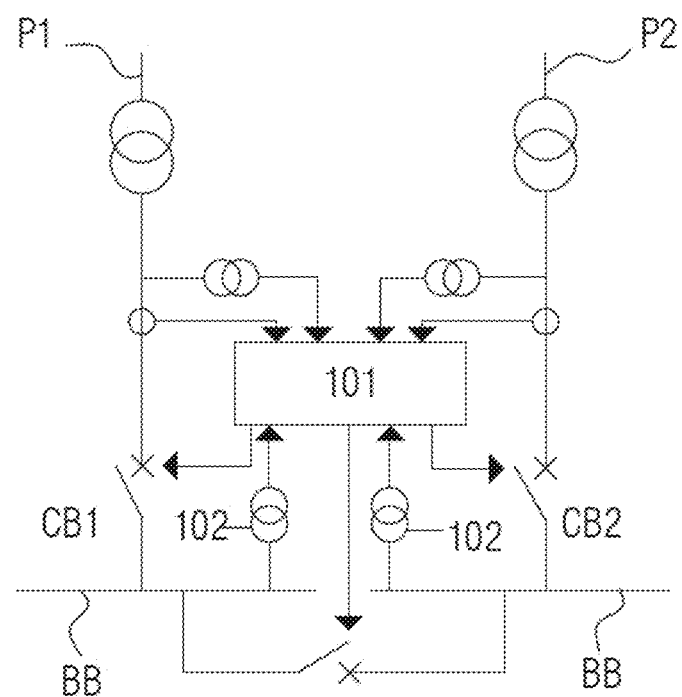
FIG. 1 is a schematic structural diagram of part of a power system comprising two power supplies.

The above and other elements, features, steps, and concepts of the present disclosure will be more apparent from the following detailed description in accordance with example embodiments of the invention, which will be explained with reference to the accompanying drawings.

Some examples of the present disclosure generally provide for a plurality of circuits, data storages, connections, or electrical devices such as e.g. processors. All references to these entities, or other electrical devices, or the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations, and elements illustrated in the drawings are not necessarily shown to scale. Rather, the various elements are represented such that their function and general purpose become apparent to a person skilled in the art. Any connection, or communication, or coupling between functional blocks, devices, components, or other physical or functional units shown in the drawings or described herein may also be implemented by an indirect connection or coupling. A communication between devices may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

In view of the above, at least one embodiment of the present invention provides a method for power supply switchover in a power system, wherein the power system comprises two power supplies, each of the power supplies is connected to a bus through an incoming line, the power supply currently in operation is used as the main power supply, the other power supply is used as a backup power supply, both the incoming line and the bus have three phases, the lines are connected by their phases, and the method comprises:

determining whether there is at least one sound phase among the three phases after identifying a fault in the power system;

if there is, obtaining a power data on the sound phase before the main power supply is disconnected, wherein the power data is used to determine whether the backup power supply meets the condition for connecting in the quick mode after the main power supply is disconnected.

In at least one embodiment of the method according to the above, optionally, determining whether there is at least one sound phase among the three phases comprises:

determining whether there is at least one sound phase among the three phases based on the incoming line corresponding to the power supply currently in operation.

In at least one embodiment of the method according to the above, optionally, determining whether the power system is faulty comprises:

obtaining the line voltage of each line in the incoming line, and determining that the power system is faulty if any line voltage of any line is lower than or equal to a first preset threshold, or obtaining the zero-sequence voltage of the incoming line, and determining that the power system is faulty if the zero-sequence voltage is higher than or equal to a second preset threshold, or obtaining the negative-sequence voltage of the incoming line, and determining that the power system is faulty if the negative-sequence voltage is higher than or equal to a third preset threshold.

In at least one embodiment of the method according to the above, optionally, determining whether there is at least one sound phase among the three phases comprises:

obtaining the current on each phase;

determining a phase is sound if the current on the phase is lower than or equal to a preset threshold and greater than or equal to a current-carrying threshold.

In at least one embodiment of the method according to the above, optionally, after obtaining a power data on the sound phase, the method comprises:

determining, through a sampling voltage on the sound phase, whether the backup power supply meets the condition for connecting in the quick mode after the main power supply is disconnected.

In at least one embodiment of the method according to the above, optionally, after obtaining a power data on the sound phase, the method further comprises:

determining, through the power data on the sound phase, whether the backup power supply meets the condition for connecting in the quick mode after the main power supply is disconnected;

if yes, sending a connecting instruction to the circuit breaker on the incoming line of the backup power supply so that the backup power supply connects in the quick mode after the main power supply is disconnected.

At least one embodiment of the present invention also provides a device for power supply switchover in a power system, wherein the power system comprises two power supplies, each of the power supplies is connected to a bus through an incoming line, the power supply currently in operation is used as the main power supply, the other power supply is used as a backup power supply, both the incoming line and the bus have three phases, the lines are connected by their phases, and the device comprises:

an identification unit, used to identify a fault in the power system, and, if a fault is identified, to trigger a determining unit;

the determining unit, used to determine whether there is at least one sound phase among the three phases, and, if there is, to trigger an obtaining unit;

the obtaining unit, used to obtain a power data on the sound phase before the main power supply is disconnected, wherein the power data is used to determine whether the backup power supply meets the condition for connecting in the quick mode after the main power supply is disconnected.

In the device according to at least one embodiment, optionally, the identification unit is specifically used to:

obtain the line voltage of each line in the incoming line, and determine that the power system is faulty if any line voltage of any line is lower than or equal to a first preset threshold, or obtain the zero-sequence voltage of the incoming line, and determine that the power system is faulty if the zero-sequence voltage is higher than or equal to a second preset threshold, or obtain the negative-sequence voltage of the incoming line, and determine that the power system is faulty if the negative-sequence voltage is higher than or equal to a third preset threshold.

In the device according to at least one embodiment, optionally, the determining unit is specifically used to:

obtain the current on each phase;

determine a phase is sound if the current on the phase is lower than or equal to a preset threshold and greater than or equal to a current-carrying threshold.

In the device according to at least one embodiment, optionally, the device further comprises:

a deciding unit, used to decide, through the power data on the sound phase, whether the backup power supply meets the condition for connecting in the quick mode after the main power supply is disconnected, and if yes, to trigger a sending unit;

the sending unit, used to send a connecting instruction to the circuit breaker on the incoming line of the backup power supply so that the backup power supply connects in the quick mode after the main power supply is disconnected.

In at least one embodiment, the present invention further provides a device for power supply switchover in a power system, wherein the power system comprises two power supplies, each of the power supplies is connected to a bus through an incoming line, the power supply currently in operation is used as the main power supply, the other power supply is used as a backup power supply, both the incoming line and the bus have three phases, the lines are connected by their phases, and the device comprises:

at least one memory, used to store instructions;

at least one processor, used to execute the method for power supply switchover in a power system according to any of the above according to the instructions in the memory.

In at least one embodiment, the present invention further provides a readable storage medium, wherein the readable storage medium stores machine-readable instructions, and, when the machine-readable instructions are executed by a machine, the machine executes the method for power supply switchover in a power system according to any of the above.

It can be seen from the above solution that, after identifying a fault in the power system, at least one embodiment of the present invention identifies a sound phase in the power line and uses the power data on the sound phase to determine whether the backup power supply meets the condition for connecting after the main power supply is disconnected. This can maximize the success rate of switching in the quick mode, thereby effectively reducing the time of power loss in the power system.

The following example embodiments will further illustrate the present invention in detail in order to clarify its purpose, technical solution and advantages.

FIG. 1 shows a schematic structural diagram of part of a power system with the fast transfer function. The power supply currently in operation is used as the main power supply, and the other power supply is used as a backup power supply. The main power supply P1 is connected to the bus through an incoming line, and the backup power supply P2 is also connected to the bus through an incoming line. The three phases in the incoming line are phase A, phase B and phase C, which are respectively connected to the corresponding three phases of the bus BB. All the loads are connected to the bus BB through the outgoing lines. That is, the incoming line, bus and outgoing line on phase A are connected, and similarly, the incoming line, bus and outgoing line on phase B and those on phase C are respectively connected. A switch CB1 is provided on the incoming line of the main power supply P1, and the main power supply P1 can be disconnected from the bus BB through the switch CB1; a switch CB2 is provided on the incoming line of the backup power supply P2, and the backup power supply P2 can be disconnected from the bus BB through the switch CB2.

When the power system is faulty, a relay protection device will be started to disconnect the main power supply P1 that is currently in operation, and the FBT system 101 will quickly switch the bus BB to the backup power supply P2. When the power system is faulty, a device in the power system may be faulty, or the line on a certain phase is faulty. For the quick mode, it is necessary to obtain the power data on one phase in real time to determine whether connecting is possible. However, the connecting time of the quick mode is only a short period of the time after the circuit breaker of the main power supply P1 is disconnected. If the connecting time is missed, the quick mode switching will fail and eventually the power loss time of the power system will be extended. In view of this, the present invention provides a method and a device for power supply switchover in a power system, which can improve the success rate of quick mode switching.

Embodiment 1

This embodiment provides a method for power supply switchover in a power system. The executor of the method is a device for power supply switchover in a power system. The device can be integrated in a FBT system, or can be provided separately, which will not be detailed here.

Figure 2:
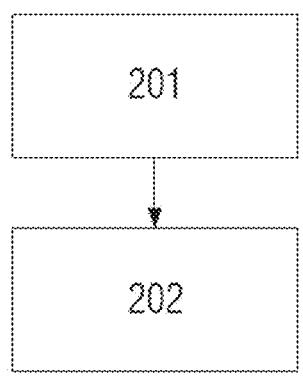
FIG. 2 is a schematic flowchart of the method for power supply switchover in a power system according to one embodiment of the present invention.

FIG. 2 shows a schematic flowchart of the method for power supply switchover in a power system according to one embodiment of the present invention. The method comprises:

Step 201, determining whether there is at least one sound phase among the three phases after identifying a fault in the power system.

There are many ways to identify a fault in a power system. For example, after a relay protection device in the power system identifies a fault, it can send a signal to the device used for power switching in the power system to let it know that the power system is faulty, or the device used for power switching in the power system can determine whether the power system is faulty, so that a fault in the power system can be identified more quickly.

To determine whether there is at least one sound phase among the three phases, whether there is at least one sound phase among the three phases may be determined specifically based on the incoming line corresponding to the main power supply currently in operation. As shown in FIG. 1, assuming that the main power supply P1 is currently in operation, the incoming line corresponding to the main power supply P1 is the line where CB1 is located. Specifically, the current of each of the phases of the incoming line may be obtained, and a certain phase is determined to be sound if the current on the phase is lower than or equal to a preset threshold and greater than or equal to a current-carrying threshold. The preset threshold here can be obtained based on experience, calculation or historical current data statistics. The current-carrying threshold here refers to the minimum value that is considered to indicate current on a certain line. When the current on a certain phase exceeds the preset threshold, the phase is determined to be faulty and taken as a faulty phase; when the current on a certain phase is lower than or equal to the preset threshold and greater than or equal to the current-carrying threshold, the phase is determined to be a sound phase. Of course, other methods may also be used to identify a sound phase, which will not be detailed here.

A sound phase in this embodiment refers to a phase that is not currently faulty. In this way, the power data on the sound phase are all data that can accurately reflect the real-time characteristics of the power system.

Step 202, if the result is yes, a power data on the sound phase is obtained before the main power supply is disconnected, wherein the power data is used to determine whether the backup power supply meets the condition for connecting in the quick mode after the main power supply is disconnected.

The number of sound phases may be one, two or three. In this embodiment, any power data on a sound phase can be selected and used as a parameter for determining the timing for the backup power supply to be connected. The power data may be, for example, the residual voltage of the bus on a sound phase. Next, the correct $\Delta\varphi$ and $\Delta f$ can be calculated based on relevant data on the sound phase, and it can be further determined whether the backup power supply meets the condition for connecting in the quick mode after the main power supply is disconnected. This condition for connecting is $\Delta\varphi < \Delta\varphi_{fast\ transfer}$ and $\Delta f < \Delta f_{fast\ transfer}$ when the device used for power switching in the power system sends a connecting instruction to the circuit breaker on the incoming line of the backup power supply, i.e., the bus BB is connected to the backup power supply P2 when this condition is met. For example, the time for the backup power supply to connect needs to be considered when the values of $\Delta\varphi_{fast\ transfer}$ and $\Delta f_{fast\ transfer}$ are determined. Wherein, $\Delta\varphi$ is the phase angle difference between the attenuated bus voltage and the voltage of the backup power supply, $\Delta f$ is the frequency difference between the attenuated bus voltage and the voltage of the backup power supply, $\Delta\varphi_{fast\ transfer}$ is the set phase difference, and $\Delta f_{fast\ transfer}$ is the set frequency difference, among which $\Delta\varphi$ and $\Delta f$ are measured in real time. How $\Delta\varphi$ and $\Delta f$ are specifically calculated is prior art and will not be detailed here.

How to determine whether the backup power supply meets the connecting condition after the main power supply is disconnected is prior art and will not be detailed here.

The inventor has found through inventive work that, for a sound phase, to determine the changes in $\Delta\varphi$ and $\Delta f$ before and after the main power supply is disconnected based on real-time electrical data does not have material impact on determining whether the condition for switching in the quick mode is met. Therefore, when the power system is found faulty, $\Delta\varphi$ and $\Delta f$ can be immediately obtained based on data on the sound phase, and it can be further determined whether the backup power supply meets the condition for connecting in the quick mode after the main power supply is disconnected.

Optionally, after Step 202, the method further comprises: before the power supply currently in operation is disconnected, determining, through a sampling voltage on the sound phase, whether the backup power supply meets the condition for connecting in the quick mode after the main power supply is disconnected. Since the calculation process is relatively short, normally, the calculation process takes less time than the time for the circuit breaker of the main power to disconnect. The time for the circuit breaker to disconnect means the time from the point when the relay protection device sends a signal to the point when the arc between the contacts of the circuit breaker of the main power supply completely extinguishes. In this way, the moment when the two power supplies can be switched, i.e., the moment for the backup power supply to be connected, can be obtained as soon as possible. If the result is yes, the backup power supply can be connected immediately after the main power supply is disconnected.

Optionally, if the result is no, after the main power supply is disconnected, the power data of any one of the three phases is used to determine whether the backup power supply meets the condition for connecting in the quick mode. That is, when no phase is sound, after the power supply currently in operation is disconnected, the power data of any one of the phases is selected and used as a parameter to determine whether the backup power supply meets the condition for connecting in the quick mode.

In this embodiment, after a fault is identified in the power system, a sound phase in the power line is identified and the power data on the sound phase is used to determine whether the backup power supply meets the condition for connecting after the main power supply is disconnected. This can maximize the success rate of connecting in the quick mode, thereby effectively reducing the time of power loss in the power system.

Embodiment 2

This embodiment provides a supplementary description of the method for power supply switchover in a power system in embodiment 1.

Figure 3:
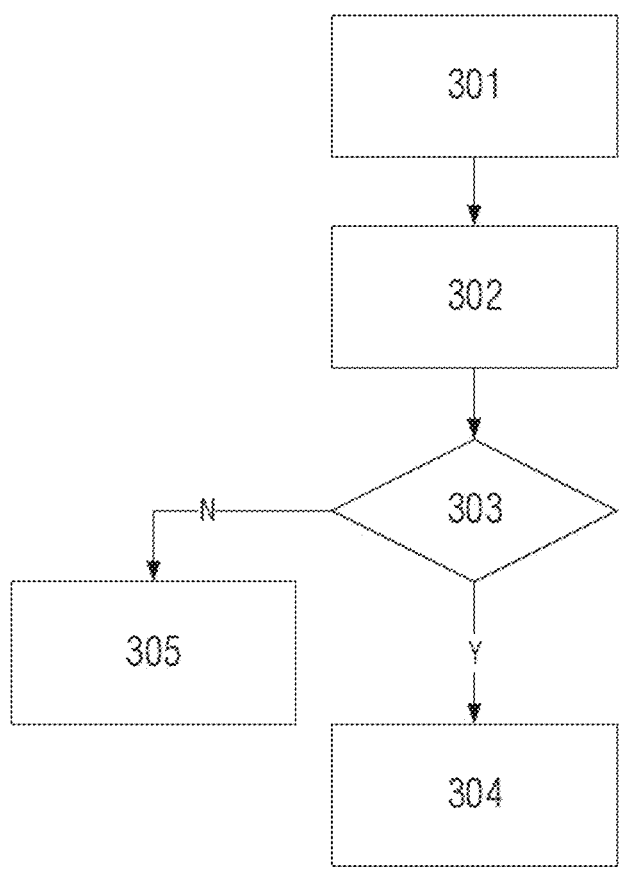
FIG. 3 is a schematic flowchart of the method for power supply switchover in a power system according to another embodiment of the present invention.

FIG. 3 is a schematic flowchart of the method for power supply switchover in a power system according to one embodiment of the present invention.

Step 301, determining whether the power system is faulty, and, if yes, going to Step 302.

The method for determining whether the power system is faulty in this embodiment may be any of the following:

obtaining the line voltage of each line in the incoming line, and determining that the power system is faulty if any line voltage of any line is lower than a first preset threshold, or obtaining the zero-sequence voltage of the incoming line, and determining that the power system is faulty if the zero-sequence voltage is higher than a second preset threshold, or obtaining the negative-sequence voltage of the incoming line, and determining that the power system is faulty if the negative-sequence voltage is higher than a third preset threshold.

This determination process may be done by the power supply switchover device in the power system. For example, a voltage sensor 102 is provided on each phase between the switch CB1 and the bus BB in FIG. 1, the voltage data of each phase in the incoming line is obtained through the voltage sensor 102, and then the line voltage, negative-sequence voltage and zero-sequence voltage are obtained. Among them, a line voltage is the voltage between any two phases. A negative-sequence voltage is the voltage component when a three-phase alternating current is unbalanced. How to specifically obtain a line voltage, negative-sequence voltage and zero-sequence voltage is prior art and will not be detailed here. Specifically, the operations of obtaining the line voltage, zero-sequence voltage, and negative-sequence voltage may be performed at the same time, and the determination is made. As long as one of them meets the above condition, it can be determined that the power system is faulty. This step is done by the device for power supply switchover in the power system, the determination is made fast, and subsequent operations can be performed as soon as possible.

The first preset threshold, the second preset threshold, and the third preset threshold in this embodiment can all be determined according to actual conditions, which will not be detailed here.

Step 302, obtaining the current of each phase in the incoming line corresponding to the main power supply, and determining a phase is sound if the current on the phase is lower than or equal to a preset threshold and greater than or equal to a current-carrying threshold.

The current of each phase is the real-time current. By sampling each phase in the incoming line, the real-time current of each phase can be obtained. If it is greater than the preset threshold, the phase is a faulty phase. If it is lower than or equal to the preset threshold and greater than or equal to the current-carrying threshold, the phase is a sound phase. There may be one, two or three sound phases.

Step 303, determining, through the power data on the sound phase, whether the backup power supply meets the condition for connecting in the quick mode after the main power supply is disconnected, and if yes, going to Step 304, or, if no, going to Step 305.

For example, $\Delta\varphi$ and $\Delta f$ are obtained based on data on a sound phase, and it can be further determined whether the backup power supply meets the condition for connecting in the quick mode after the main power supply is disconnected. Since the determination process is very short, it can be completed before the circuit breaker of the power supply currently in operation is disconnected. How to specifically determine whether the backup power supply meets the connecting condition based on $\Delta\varphi$ and $\Delta f$ is prior art and will not be detailed here.

Step 304, sending a connecting instruction to the circuit breaker on the incoming line of the backup power supply so that the backup power supply connects in the quick mode after the main power supply is disconnected.

In this way, after it is determined that the backup power supply meets the condition for connecting through the power data on a sound phase, it is possible to send a connecting instruction to the circuit breaker on the incoming line of the backup power supply immediately after the power supply currently in operation is disconnected so that the backup power supply connects as soon as possible.

Step 305, determining whether the backup power supply meets the connecting condition in the real-time quick mode.

The real-time quick mode is a mode initiated when the condition for the quick mode is not met. The condition for the real-time quick mode is prior art and will not be detailed here. Of course, when the determination result in Step 303 is no, the process may go directly to determining whether the condition for the same-phase capturing mode, residual voltage mode or another existing switchover mode is met, which will not be detailed here.

Among them, the real-time quick mode may be, for example:

1) calculating the amplitude of the difference of voltage vector $\Delta U_{forecast}$ between the bus and the backup power supply and the phase angle difference $\Delta\varphi_{forecast}$ between the bus and the backup power supply; and 2) switching the bus load to the backup power supply only when $\Delta U_{forecast}$ is lower than its limit $\Delta U_{RTFTparameter}$, and $\Delta\varphi_{forecast}$ is smaller than 90°.

The real-time quick mode is prior art and will not be detailed here.

According to this embodiment, after a fault is identified in the power system, a sound phase in the power line is identified and the power data on the sound phase is used to determine whether the backup power supply meets the condition of the quick mode, and, when it is determined that the condition of the quick mode is met, the backup power supply is connected immediately after the main power supply is disconnected, thus maximizing the success rate of connecting in the quick mode and thereby effectively reducing the time of power loss in the power system.

Embodiment 3

This embodiment provides a device for power supply switchover in a power system. The power system comprises two power supplies, each of the power supplies is connected to a bus through an incoming line, the power supply currently in operation is used as the main power supply, the other power supply is used as a backup power supply, both the incoming line and the bus have three phases, and the lines are connected by their phases.

Figure 4:
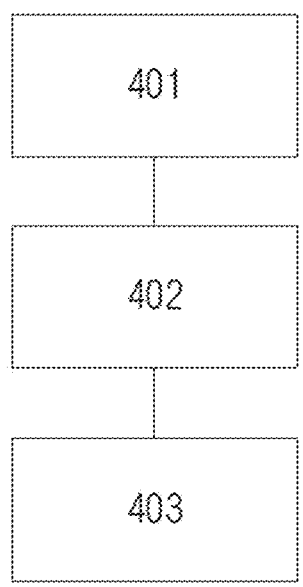
FIG. 4 is a schematic structural diagram of the device for power supply switchover in a power system according to one embodiment of the present invention.

As shown in FIG. 4, the device for power supply switchover in a power system in this embodiment comprises an identification unit 401, a determining unit 402 and an obtaining unit 403. Among them, the identification unit 401 is used to determine whether the power system is faulty, and, if the result is yes, to trigger a determining unit 402; the determining unit 402 is used to determine whether at least one phase is sound among the three phases, and, if the result is yes, to trigger an obtaining unit 403; the obtaining unit 403 is used to obtain a power data on the sound phase before the main power supply is disconnected, wherein the power data is used to determine whether the backup power supply meets the condition for connecting in the quick mode after the main power supply is disconnected.

Optionally, the identification unit 401 is specifically used to:

obtain the line voltage of each line in the incoming line, and determine that the power system is faulty if any line voltage of any line is lower than or equal to a first preset threshold, or obtain the zero-sequence voltage of the incoming line, and determine that the power system is faulty if the zero-sequence voltage is higher than or equal to a second preset threshold, or obtain the negative-sequence voltage of the incoming line, and determine that the power system is faulty if the negative-sequence voltage is higher than or equal to a third preset threshold.

Optionally, the determining unit 402 is specifically used to:

obtain the current on each phase; and determine a phase is sound if the current on the phase is lower than or equal to a preset threshold.

Figure 5:
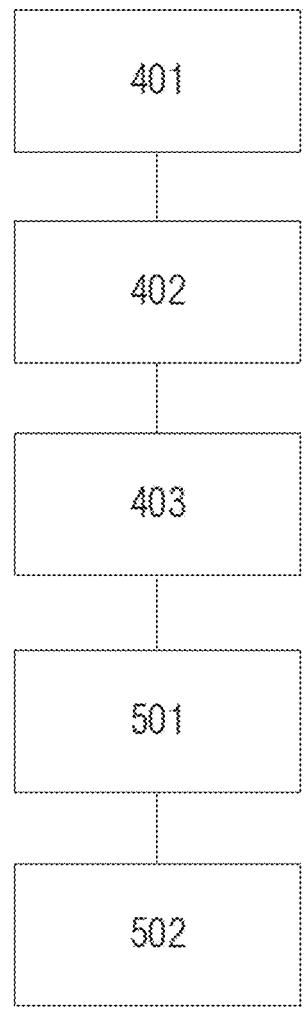
FIG. 5 is a schematic structural diagram of the device for power supply switchover in a power system according to another embodiment of the present invention.

Optionally, as shown in FIG. 5, the device for power supply switchover in a power system in this embodiment further comprises a deciding unit 501 and a sending unit 502, wherein the deciding unit 501 is used to decide, through the power data on a sound phase, whether the backup power supply meets the condition for connecting in the quick mode after the main power supply is disconnected, and if yes, to trigger the sending unit 502. The sending unit 502 is used to send a connecting instruction to the circuit breaker on the incoming line of the backup power supply so that the backup power supply connects in the quick mode after the main power supply is disconnected.

The operation methods of each of the units in this embodiment are the same as those in the previous embodiments and will not be repeated here.

In this embodiment, after a fault is identified in the power system, a sound phase in the power line is identified and the power data on the sound phase is used to determine whether the backup power supply meets the condition for connecting after the main power supply is disconnected. This can maximize the success rate of switching in the quick mode, thereby effectively reducing the time of power loss in the power system.

At least one embodiment of the present invention also provides a device for power supply switchover in a power system, wherein the power system comprises two power supplies, each of the power supplies is connected to a bus through an incoming line, the power supply currently in operation is used as the main power supply, the other power supply is used as a backup power supply, both the incoming line and the bus have three phases, the lines are connected by their phases, and the device comprises at least one memory and at least one processor. Among them, the memory is used to store instructions. The processor is used to execute the method for power supply switchover in a power system described in any of the above embodiments according to the instructions in the memory.

The embodiments of the present invention also provide a readable storage medium. The readable storage medium stores machine-readable instructions, and, when the machine-readable instructions are executed by a machine, the machine executes the method for power supply switchover in a power system described in any of the above embodiments.

The readable storage medium stores machine-readable instructions, and, when the machine-readable instructions are executed by a machine, the processor executes any of the methods of at least one embodiment. Specifically, a system or device equipped with a readable storage medium may be provided, the software program code for implementing the functions of any of the above embodiments is stored on the readable storage medium, and a computer or processor of the system or device can read and execute the machine-readable instructions stored in the readable storage medium.

In this case, the program code itself read from the readable medium can implement the functions of any of the above embodiments, and so the machine readable code and the readable storage medium storing the machine readable code constitute part of at least one embodiment of the present invention.

Examples of the readable storage medium include floppy disks, hard disks, magneto-optical disks, optical disks (such as CD-ROM, CD-R, CD-RW, DVD-ROM, DVD-RAM, DVD-RW, DVD+RW), magnetic tape, volatile memory cards and ROM. Optionally, the program code may be downloaded from a server computer or a cloud via a communication network.

Those skilled in the art should understand that the various embodiments disclosed above can be transformed and modified without departing from the essence of the present invention. Therefore, the scope of the present invention should be limited by the appended claims.

It should be noted that not all steps and units in the above processes and system structure diagrams are necessary, and some steps or units can be ignored based on actual needs. The sequence of execution of the steps is not fixed, and can be adjusted as needed. The device structure described in the above embodiments may be a physical structure or a logical structure, i.e., some units may be implemented by the same physical entity, or some units may be implemented by multiple physical entities, or may be implemented by certain components in several independent devices working together.

In the above embodiments, the hardware units may be implemented mechanically or electrically. For example, a hardware unit or processor may comprise a permanent dedicated circuit or logic (such as a dedicated processor, FPGA or ASIC) to complete the corresponding operation. The hardware unit or processor may also comprise a programmable logic or circuit (such as a general-purpose processor or other programmable processors), which may be temporarily set by software to complete the corresponding operation. The specific implementation method (mechanical, or by a dedicated permanent circuit, or a temporarily set circuit) may be determined based on the cost and time considerations.

The above are only some preferred embodiments of the present invention, and are not intended to limit the present invention. Any modification, equivalent replacement and improvement made without departing from the motivation and principle of the present invention shall be included in the scope of the present invention.

Although the invention has been illustrated in greater detail using the example embodiments, the invention is not limited by the disclosed examples, and a person skilled in the art can derive other variations therefrom without departing from the scope of protection of the invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for power supply switchover in a power system including two power supplies, each power supply of the two power supplies being connected to a bus through an incoming line, a power supply of the two power supplies currently in operation usable as a main power supply and another power supply of the two power supplies being usable as a backup power supply, both the incoming line and the bus including three phases, and respective lines being connected by respective phases, the method comprising:
   determining whether there is at least one sound phase among the three phases in response to identifying a fault in the power system; and
   obtaining, before disconnection of the main power supply and in response to determining at least one sound phase among the three phases, power data on the at least one sound phase, the power data being usable to determine whether the backup power supply meets a condition for connecting in a quick mode after disconnection of the main power supply.

2. The method of claim 1, wherein the determining whether there is at least one sound phase among the three phases comprises:
   determining whether there is at least one sound phase among the three phases based on the incoming line corresponding to the power supply currently in operation.

3. The method of claim 2, further comprising:
   determining, based on a sampling voltage of the power data on the sound phase, whether the backup power supply meets the condition for connecting in the quick mode after the main power supply is disconnected.

4. The method of claim 2, further comprising:
   determining, based on the power data on the sound phase, whether the backup power supply meets the condition for connecting in the quick mode after the main power supply is disconnected; and
   sending, in response to determining that the backup power supply meets the condition for connecting in the quick mode, a connecting instruction to a circuit breaker on the incoming line of the backup power supply to connect the backup power supply in the quick mode after the main power supply is disconnected.

5. The method of claim 1, further comprising:
   determining whether the power system is faulty by identifying a fault in the power system, including at least one of
      obtaining a line voltage of the incoming line and determining that the power system is faulty in response to the line voltage being lower than or equal to a first threshold,
      obtaining a zero-sequence voltage of the incoming line and determining that the power system is faulty in response to the zero-sequence voltage being higher than or equal to a second threshold, or
      obtaining a negative-sequence voltage of the incoming line and determining that the power system is faulty in response to the negative-sequence voltage being higher than or equal to a third threshold.

6. The method as claimed in claim 5, further comprising:
   determining, based on a sampling voltage of the power data on the sound phase, whether the backup power supply meets the condition for connecting in the quick mode after the main power supply is disconnected.

7. The method of claim 5, further comprising:
   determining, based on the power data on the sound phase, whether the backup power supply meets the condition for connecting in the quick mode after the main power supply is disconnected; and
   sending, in response to determining that the backup power supply meets the condition for connecting in the quick mode, a connecting instruction to a circuit breaker on the incoming line of the backup power supply to connect the backup power supply in the quick mode after the main power supply is disconnected.

8. The method of claim 1, wherein the determining whether there is at least one sound phase among the three phases comprises:
   obtaining a respective current on each respective phase of the three phases; and
   determining that a respective phase is sound in response to
      the respective current on the respective phase being lower than or equal to a threshold, and
      the respective current on the respective phase being greater than or equal to a current-carrying threshold.

9. The method of claim 1, further comprising:
   determining, based on a sampling voltage of the power data on the sound phase, whether the backup power supply meets the condition for connecting in the quick mode after the main power supply is disconnected.

10. The method of claim 1, further comprising:
   determining, based on the power data on the sound phase, whether the backup power supply meets the condition for connecting in the quick mode after the main power supply is disconnected; and
   sending, in response to determining that the backup power supply meets the condition for connecting in the quick mode, a connecting instruction to a circuit breaker on the incoming line of the backup power supply to connect the backup power supply in the quick mode after the main power supply is disconnected.

11. A non-transitory machine readable storage medium, storing machine-readable instructions that, when executed cause one or more processors to carry out the method of claim 1.

12. The method of claim 1, further comprising:
   determining, using the power data, whether the backup power supply meets the condition for connecting in the quick mode after disconnection of the main power supply.

13. A power system for power supply switchover, the power system comprising:
   a main power supply connected through to a bus through a first incoming line, the first incoming line and the bus including three phases, the bus and the first incoming line configured to be connected by respective phases;

a backup power supply connected to the bus through a second incoming line; and processing circuitry configured to cause the power system to identify a fault in the power system, determine whether there is at least one sound phase among the three phases, in response to identifying the fault in the power system, and obtain, before disconnection of the main power supply and in response to determining at least one sound phase among the three phases, power data on the at least one sound phase, the power data being usable to determine whether the backup power supply meets a condition for connecting in a quick mode after disconnection of the main power supply.

14. The power system of claim 13, wherein the processing circuitry is further configured to cause the power system to:

obtain a line voltage of the first incoming and determine that the power system is faulty in response to the line voltage being lower than or equal to a first threshold;

obtain a zero-sequence voltage of the first incoming line and determine that the power system is faulty in response to the zero-sequence voltage being higher than or equal to a second threshold; or obtain a negative-sequence voltage of the first incoming line, and determine that the power system is faulty in response to the negative-sequence voltage being higher than or equal to a third threshold.

15. The power system of claim 13, wherein the processing circuitry is further configured to cause the power system to:

obtain a respective current on each respective phase of the three phases; and determine that a respective phase is sound in response to the respective current on the respective phase being lower than or equal to a threshold, and the respective current on the respective phase being greater than or equal to a current-carrying threshold.

16. The power system of claim 13, wherein the processing circuitry is further configured to cause the power system to:

determine, based on the power data on the sound phase, whether the backup power supply meets the condition for connecting in the quick mode after the main power supply is disconnected, and send a connecting instruction to a circuit breaker on the incoming line of the backup power supply to connect the backup power supply in the quick mode after the main power supply is disconnected, in response to determining that the backup power supply meets the condition for connecting in the quick mode.

17. The power system of claim 13, wherein the processing circuitry is further configured to cause the power system to determine, based on the power data, whether the backup power supply meets the condition for connecting in the quick mode after disconnection of the main power supply.

18. A device for power supply switchover in a power system including two power supplies, each power supply of the two power supplies being connected to a bus through an incoming line, a power supply currently in operation of the two power supplies being usable a main power supply and another power supply of the two power supplies being usable as a backup power supply, both the incoming line and the bus including three phases, and respective lines being connected by respective phases, the device comprising:

at least one memory, storing instructions; and at least one processor, configured to execute the instructions to cause the device to determine whether there is at least one sound phase among the three phases in response to identifying a fault in the power system; and obtain, before disconnect of the main power supply and in response to determining at least one sound phase among the three phases, power data on the at least one sound phase, the power data being usable to determine whether the backup power supply meets a condition for connecting in a quick mode after disconnection of the main power supply.

19. The device of claim 18, wherein the at least one processor is further configured cause the device determine, based on the power data, whether the backup power supply meets the condition for connecting in the quick mode after disconnection of the main power supply.

* * * * *